United States Patent
Bastnagel et al.

(10) Patent No.: US 9,341,118 B2
(45) Date of Patent: May 17, 2016

(54) VARIOUS LAYERED GAS TURBINE ENGINE COMPONENT CONSTRUCTIONS

(75) Inventors: Philip M. Bastnagel, Indianapolis, IN (US); Edward Claude Rice, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 1180 days.

(21) Appl. No.: 12/951,152

(22) Filed: Nov. 22, 2010

(65) Prior Publication Data

US 2011/0185738 A1 Aug. 4, 2011

Related U.S. Application Data

(60) Provisional application No. 61/290,712, filed on Dec. 29, 2009.

(51) Int. Cl.
| | |
|---|---|
| *F02C 7/12* | (2006.01) |
| *F01D 25/14* | (2006.01) |
| *F23R 3/00* | (2006.01) |

(52) U.S. Cl.
CPC ............... *F02C 7/12* (2013.01); *F01D 25/145* (2013.01); *F23R 3/002* (2013.01); *F23R 3/007* (2013.01); *F23R 2900/03041* (2013.01); *Y10T 29/49229* (2015.01)

(58) Field of Classification Search
CPC .. F02C 7/12; F23M 2900/05004; F23M 5/04; F23M 5/00; F23M 20/005; F23M 2700/00; F23D 14/46; F23D 14/58; F23D 2201/30; F23D 2210/00; F23D 2210/101; F23D 2211/00

USPC .................................................... 60/752–760
See application file for complete search history.

(56) References Cited

U.S. PATENT DOCUMENTS

| | | | |
|---|---|---|---|
| 3,793,861 A | 2/1974 | Burkhard et al. | |
| 3,918,255 A | 11/1975 | Holden | |
| 4,195,475 A * | 4/1980 | Verdouw | 60/754 |
| 4,302,940 A * | 12/1981 | Meginnis | 60/754 |
| 4,621,499 A | 11/1986 | Mori et al. | |
| 5,127,221 A * | 7/1992 | Beebe | 60/772 |

(Continued)

FOREIGN PATENT DOCUMENTS

| | | | | |
|---|---|---|---|---|
| DE | EP 1847696 A1 * | 10/2007 | ............... | F02C 3/16 |
| EP | 2072634 A2 | 6/2009 | | |

(Continued)

OTHER PUBLICATIONS

Metal Foams: A Design Guide, Michael F. Ashby, et al., 2000.

(Continued)

*Primary Examiner* — Phutthiwat Wongwian
*Assistant Examiner* — Rene Ford
(74) *Attorney, Agent, or Firm* — Brinks Gilson & Lione; John C. Bacoch

(57) ABSTRACT

A gas turbine engine component is disclosed having a construction that permits a working fluid to flow from one side of the component to the other. In one embodiment the construction includes multiple layers, and in one particular embodiment the construction includes three layers. One or more layers can have different properties. Additionally, one or more layers of the construction can include a cellular structure. In one embodiment the component is a gas turbine engine combustor liner.

13 Claims, 3 Drawing Sheets

(56) References Cited

U.S. PATENT DOCUMENTS

| | | | |
|---|---|---|---|
| 5,184,455 A * | 2/1993 | Ewing et al. | 60/772 |
| 5,216,886 A * | 6/1993 | Ewing | 60/752 |
| 5,363,645 A * | 11/1994 | Pellet | 60/267 |
| 5,438,834 A | 8/1995 | Vuillamy et al. | |
| 5,499,499 A | 3/1996 | Ambrogi et al. | |
| 5,720,597 A | 2/1998 | Wang et al. | |
| 5,749,229 A * | 5/1998 | Abuaf et al. | 60/752 |
| 6,443,700 B1 | 9/2002 | Grylls et al. | |
| 6,511,762 B1 * | 1/2003 | Lee et al. | 428/697 |
| 6,544,003 B1 | 4/2003 | Grylls et al. | |
| 6,648,596 B1 * | 11/2003 | Grylls et al. | 415/200 |
| 6,698,331 B1 | 3/2004 | Yu et al. | |
| 6,755,619 B1 | 6/2004 | Grylls et al. | |
| 6,827,556 B2 | 12/2004 | Simon | |
| 6,840,047 B2 | 1/2005 | Schmahl et al. | |
| 6,971,841 B2 * | 12/2005 | Care | 415/9 |
| 7,186,091 B2 * | 3/2007 | Lee et al. | 416/231 R |
| 7,263,772 B2 * | 9/2007 | Prociw et al. | 29/890 |
| 8,047,001 B2 * | 11/2011 | Beeck et al. | 60/737 |
| 2005/0249602 A1 * | 11/2005 | Freling et al. | 416/241 B |
| 2013/0000309 A1 * | 1/2013 | Dierberger | 60/752 |

FOREIGN PATENT DOCUMENTS

| | | |
|---|---|---|
| GB | 2053450 A | 2/1981 |
| JP | H10-231704 | 2/1998 |

OTHER PUBLICATIONS

International Search Report and Written Opinion, Nov. 25, 2011, PCT/US2010/062382.

Japanese Office Action, JP Patent Application No. 2012-547271, Rolls-Royce Corporation, Sep. 1, 2014 (3 pages).

English language translation of Japanese Office Action, JP Patent Application No. 2012-547271, Rolls-Royce Corporation, Sep. 1, 2014 (3 pages).

English language translation of JP H10-231704, Ishikawajima Harima Heavy Ind. Co., Ltd., Sep. 2, 1998 (2 pages).

Extended European search report in corresponding European application (i.e., EP 10 85 1165), mailed Feb. 23, 2015 (6 pages).

* cited by examiner

VARIOUS LAYERED GAS TURBINE ENGINE COMPONENT CONSTRUCTIONS

CROSS REFERENCE TO RELATED APPLICATIONS

The present application claims the benefit of U.S. Provisional Patent Application 61/290,712, filed Dec. 29, 2009, and is incorporated herein by reference.

TECHNICAL FIELD

The present invention generally relates to gas turbine engine components having passages that permit a flow of air, and more particularly, but not exclusively, to cooled gas turbine engine components.

BACKGROUND

Providing components capable of conveying an internal airflow for use in gas turbine engines remains an area of interest. Some existing systems have various shortcomings relative to certain applications. Accordingly, there remains a need for further contributions in this area of technology.

SUMMARY

One embodiment of the present invention is a unique gas turbine engine liner construction for a gas turbine engine. Other embodiments include apparatuses, systems, devices, hardware, methods, and combinations for constructing cooled gas turbine engine components. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
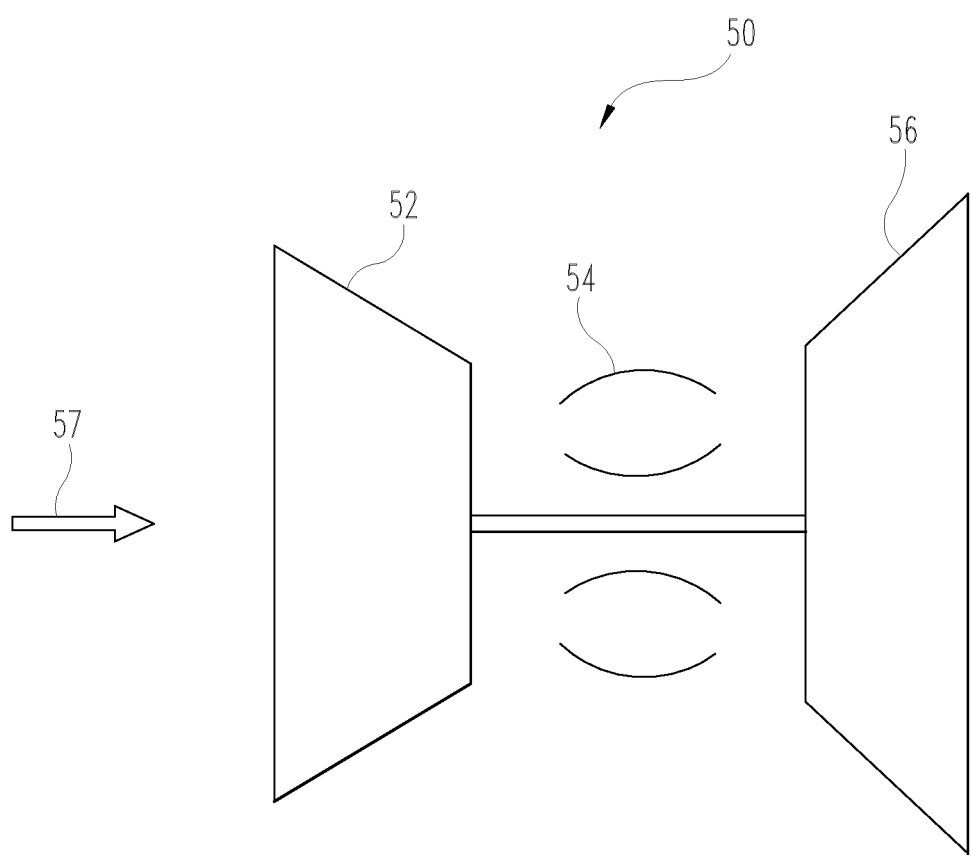
FIG. 1 depicts an embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 suitable for use as an aircraft power plant is shown. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

The gas turbine engine 50 includes a compressor 52, combustor 54, and turbine 56. An airflow 57 enters the compressor 52 whereupon it is compressed and passed to the combustor 54 to be mixed with fuel and burned. The products of combustion produced from a combustion event exit the combustor 54 and are passed to a turbine 56 before exiting the gas turbine engine 50. Though the gas turbine engine 50 is shown as a single-spool, axial flow engine, other engine types and configurations are also possible. In one non-limiting example, the compressor 52 can include a high pressure and low pressure compressor, and in some forms may include a mixed axial/centrifugal flow compressor sections. The gas turbine engine 50 can be an adaptive cycle or variable cycle engine. Furthermore, in some embodiments the gas turbine engine 50 can take the form of a turbofan, turboprop, turbojet, or turboshaft engine suitable for use as a power plant at a variety of flight conditions. Other variations and combinations of gas turbine engine 50 are also contemplated herein.

Figure 2:
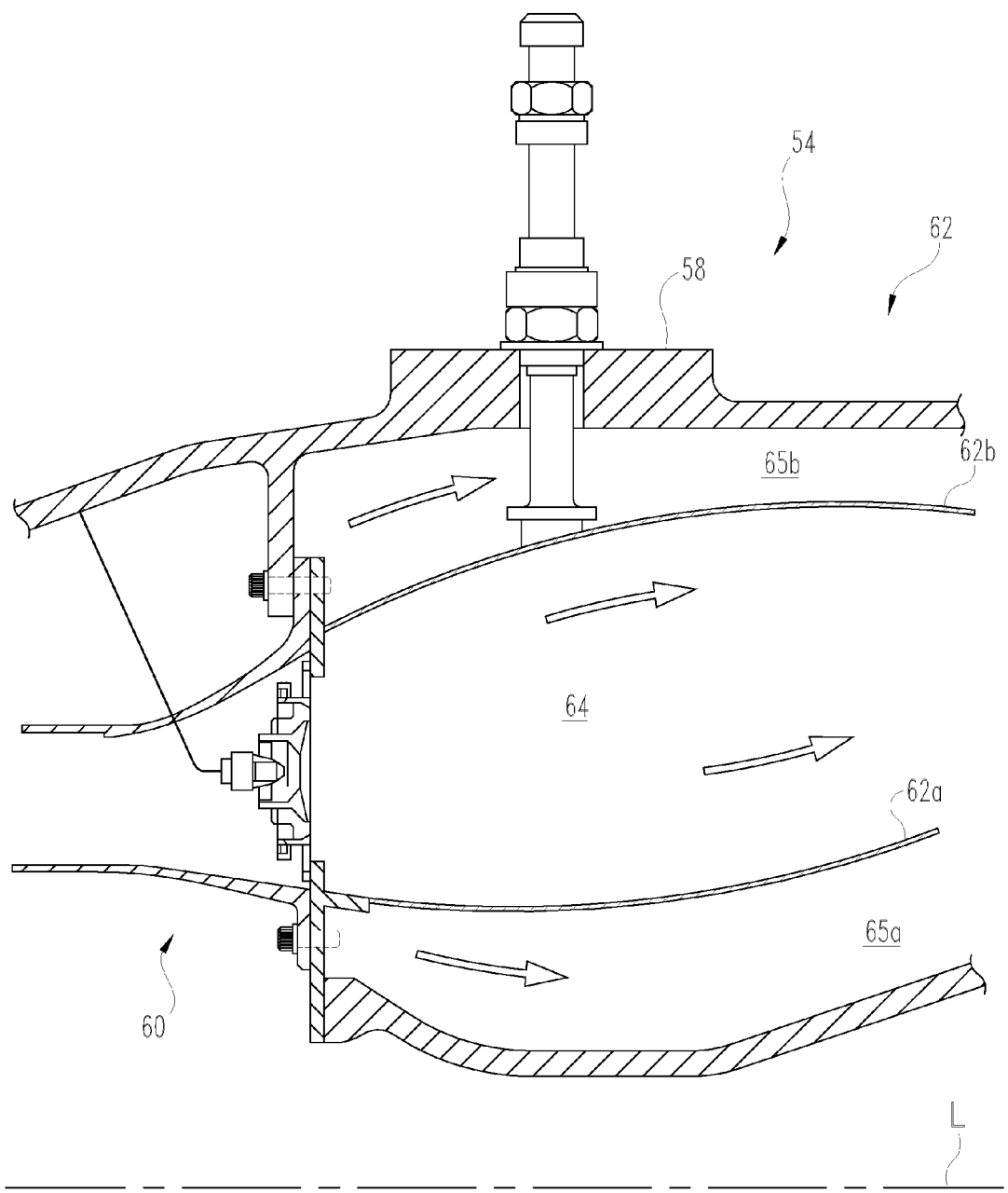
FIG. 2 depicts an embodiment of a gas turbine engine combustor.

Turning now to FIG. 2, one form of the combustor 54 is shown. The combustor 54 of the illustrated embodiment is sometimes referred to as an annular combustor. In other embodiments, however, the combustor 54, can take different forms such as can/tubular combustor or can-annular combustor. Furthermore, the combustor 54 can be a straight-through flow combustor, as illustrated, or a reverse flow combustor. The combustor 54 includes a casing 58, fuel nozzle 60, and liner 62, but in other embodiments can include fewer or additional components. The casing 58 provides a region within which combustion occurs after air is mixed with fuel provide by the fuel nozzle 60. The fuel nozzle 60 can take a variety of forms than that depicted in the illustrative embodiment. In some forms the fuel nozzle 60 can include internal air and fuel passages, air swirlers, and fuel filmers, among others. The fuel nozzle 60 can take the form of an air blast atomizer, among other types. The liner 62 includes an inner combustor liner wall 62a and outer combustor liner wall 62b that together at least partially define a combustion zone 64. Compressed air from the compressor 52 is mixed with fuel from the fuel nozzle 60 and burned between the inner combustor liner wall 62a and outer combustor liner wall 62b in the combustion zone 64. Flow through areas 65a and 65b are provided outside of the combustion zone 64 and can experience relatively cooler temperatures than the combustion zone 64.

Figure 3:
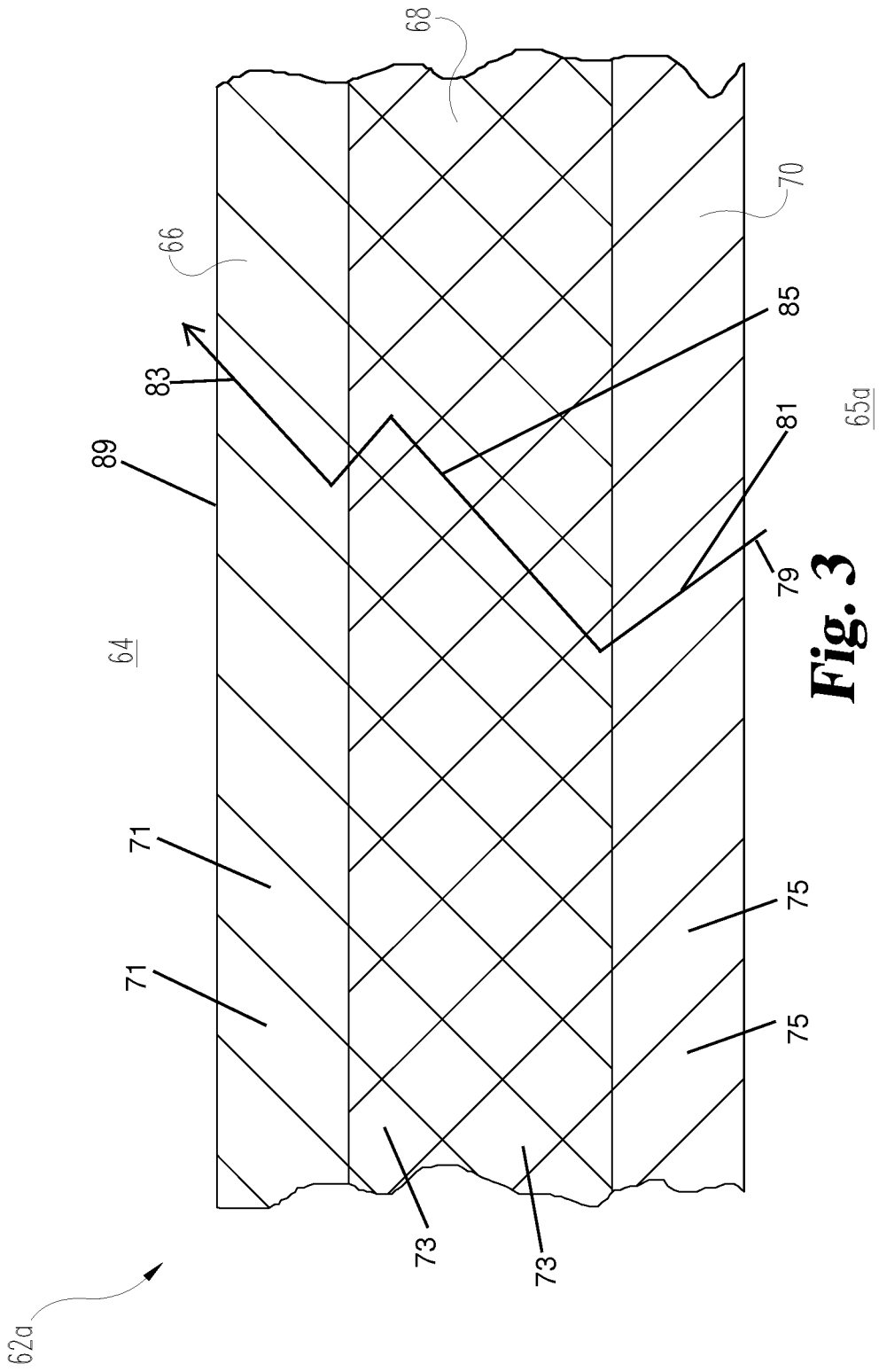
FIG. 3 depicts an embodiment of a combustor liner of a gas turbine engine combustor.

Referring to FIG. 3, there is illustrated a sectional view of a portion of inner combustor liner wall 62a which includes inner layer 66, middle layer 68, and outer layer 70. Some forms of the inner combustor liner wall 62a can include fewer or more layers, and may include other structures not otherwise depicted in the illustrative embodiment. Although the embodiment shown in FIG. 3 is the inner combustor liner wall 62a, the outer combustor liner wall 62b can have the same or similar construction. Indeed, other components from the gas turbine engine 50 can have a similar construction as will be described for the inner combustor liner wall 62a. Thus, the following description as it relates to the inner combustor liner wall 62a is equally applicable to other components of the gas turbine engine 50 and no limitation is hereby intended. The inner layer 66 of the illustrative embodiment is in proximity to the combustion zone 64, a hot region of the combustor 54, while the outer layer 70, in contrast, is located in proximity to a relatively cooler region than the combustion zone 64.

Layers 66, 68, and 70 include one or more portions having a permeability that permits a working fluid to flow through the inner combustor liner wall 62a. The working fluid can take the form of air or a combination of air and products of combustion, among other possible fluids and can traverse in either direction between the combustion zone 64 and the flow through area 65a. The working fluid traverses from a higher pressure side of the inner combustor liner wall 62a to a lower pressure side. The flow rate of the working fluid through the liner wall 62a is dependent upon the difference in pressure and the permeability of the layered construction, among other possible factors.

In one form the layers 66, 68, and/or 70 are of porous construction which permits cooling air to traverse between them without the need to drill or otherwise manufacture a defined cooling channel. In some embodiments, however, one or more of the layers 66, 68, and 70 can include a defined cooling channel. The layers 66, 68, and 70 can be formed having a cellular construction or reticulated structure such as foamed materials or MICROMASS (Porvair Advanced Materials, Inc., 700 Shepherd Street, Hendersonville N.C. 28792), among potential others. Such foamed materials can be made by foaming a molten or melted material using gas injection or blowing agents, among other possible processes. The materials can be metallic in one embodiment. In one form one or more of the layers 66, 68, and 70 can be an open celled construction. One or more of the layers 66, 68, and 70 can have a plurality of open cells along a direction the crosses each of the layers. One or more of the layers 66, 68, and 70 can be produced using a variety of techniques such as, but not limited to, powdered metallurgy, metallic sintering, metal deposition through evaporation, electrodeposition, chemical vapor deposition (CVD), molten metal infiltration, and investment casting.

The layers 66, 68, and/or 70 can be coupled using a variety of techniques. In some forms the layers 66, 68, and 70 can all be coupled using the same technique, while in other forms the type of coupling between layers can be different. To provide just a few non-limiting examples, the layers 66, 68, and 70 can be coupled by welding or brazing or other suitable fabrication techniques. Additionally and/or alternatively, the layers 66, 68, and 70 can be coupled using mechanical fasteners, if desired. Other types of techniques are also possible.

Certain characteristics of the layers 66, 68, and 70 can be tailored to provide desired properties for the intended use of the layers. For example, the porosity and density of the layers, among potential others, can be tailored to adjust through wall airflow, wall stiffness, and heat transfer properties. Additionally, porosity, density, strength, and thermal conductivity can be tailored. Other characteristics that can be tailored include pore size, pore packing, area exposed to fluid flow, and foam thickness, among potential others. In some embodiments the layers 66, 68, and 70 can all have the same characteristics, while in other embodiments the characteristics may differ. In one nonlimiting embodiment, the layer 68 can have a higher permeability than either of the layers 66 and 70. The layers 66 and 70 in this embodiment, furthermore, can have the same or different permeability relative to each other.

One aspect of the present application provides a combustor liner for use within a gas turbine engine. The combustor liner includes lamina of porous sections, at least two of the sections having different porosity. The combustor liner also includes a cooling flow passage or passages through the porous sections such that transpiration cooling may be provided through the combustor linear. The porous sections can take the form of a foamed material or MICROMASS. In one form the foamed material is a metal foam.

In yet another aspect, the present application provides an apparatus comprising a gas turbine engine component composition having a first porous portion located on a hot side of the component and a second porous portion coupled with the first porous portion and located on a cold side of the composition, the first porous portion and the second porous portion having a plurality of pores arranged along their thicknesses between the hot side and the cold side, the first porous portion and the second porous portion structured to permit the passage of a cooling working fluid between the cold side and the hot side to provide transpiration cooling.

In still a further aspect, the present application provides an apparatus comprising a combustor liner having a thickness that includes a first cellular structured member adjacent a second cellular structured member and arranged to permit a cooling flow to pass from the first cellular structured member to the second cellular structured member.

In still a further aspect, the present application provides an apparatus comprising a gas turbine engine component having a layered construction including first layer disposed between a second layer and a cold side of the gas turbine engine component, and means for transpiration cooling the component, the means located throughout a portion of the first layer and throughout a portion of the second layer.

In yet a further aspect, the present application provides a method comprising locating a relatively cold side porous layer having open cells of a gas turbine engine component adjacent to a relatively hot side porous layer having open cells of a gas turbine engine component to create a layered porous construction, and coupling the cold side porous layer having open cells to the hot side porous layer having open cells, wherein the coupling includes forming a cooling passage between the cold side porous layer to the hot side porous layer.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a gas turbine engine component composition having a first foamed material portion located on a hot side of the component, a second foamed material portion coupled with the first foamed material portion, and a third foamed material portion coupled with the second foamed material portion and located on a cold side of the composition, the first foamed material portion, the second foamed material portion, and the third foamed material portion each having a plurality of pores arranged along their thicknesses between the hot side and the cold side, the first foamed material portion, the second foamed material portion, and the third foamed material portion structured to permit the passage of a cooling working fluid between the cold side and the hot side to provide transpiration cooling, wherein the second foamed material portion has a higher porosity than the first foamed material portion and the third foamed material portion, and the first foamed material portion includes a cellular configuration having a working fluid passage formed therethrough and wherein the first foamed material portion is a support structural portion that provides strength to the gas turbine engine component composition, wherein the first foamed material portion and second foamed material portion of the gas turbine engine component construction are sufficiently rigid to maintain a shape of the component construction.

2. The apparatus of claim 1, wherein the working fluid passage is defined by the cellular configuration.

3. The apparatus of claim 2, wherein the cellular configuration is an open cellular configuration.

4. The apparatus of claim 1, wherein the first foamed material portion has a density of pores the same as a density of pores of the third foamed material portion.

5. The apparatus of claim 1, wherein the first foamed material portion is metallic or ceramic.

6. An apparatus comprising:
a combustor liner having a thickness that includes a first foamed material member, a second foamed material member, and a third foamed material member, the first foamed material member adjacent the second foamed material member, and the second foamed material member adjacent the third foamed material member, and the foamed material members arranged to permit a cooling flow to pass from the first foamed material member to the second foamed material member to the third foamed material member, the first foamed material member, the second foamed material member, and the third foamed material member are each free of a substrate or other structure that aids in maintaining a shape of the combustor liner such that the strength of the combustor liner is solely provided by the first foamed material member, the second foamed material member, and the third foamed material member, and wherein a porosity of the second foamed material member is greater than a porosity of the first foamed material member and a porosity of the third foamed material member.

7. The apparatus of claim 6, wherein the second foamed material member is positioned between a hot side of the combustor liner and the first foamed material member.

8. The apparatus of claim 7, where the first foamed material member has a higher thermal conductivity than the second foamed material member.

9. The apparatus of claim 6, wherein the second foamed material member has a lower density than the first foamed material member.

10. The apparatus of claim 6, wherein the second foamed material member forms a structural support for the combustor liner.

11. The apparatus of claim 6, wherein the first foamed material member is formed of a metal or a ceramic.

12. A method comprising:
providing a relatively cold side foamed material layer having open cells of a gas turbine engine component and a relatively hot side foamed material layer having open cells of a gas turbine engine component;
locating the relatively cold side foamed material layer of the gas turbine component adjacent to the relatively hot side foamed material layer of the gas turbine engine component to create a layered foamed material construction;
coupling the relatively cold side foamed material layer having open cells to the relatively hot side foamed material layer having open cells, wherein the coupling is performed after the providing and includes forming a cooling passage between the relatively cold side foamed material layer to the relatively hot side foamed material layer, wherein the coupling results in the component having a shape solely maintained by the structural strength of the relatively cold side foamed material layer and the relatively hot side foamed material layer; and
coupling a third foamed material layer to the layered foamed material construction, wherein the third foamed material layer is of greater porosity than the relatively hot side foamed material and the relatively cold side foamed material, the coupling a third foamed material layer including connecting the cooling passage between the relatively cold side foamed material layer to the relatively hot side foamed material layer with a passage within the third foamed material layer.

13. The method of claim 12, wherein the coupling a third foamed material layer includes coupling the third foamed material layer on a hot side of the relatively hot side foamed material, the relatively hot side foamed material layer having a porosity higher than the relatively cold side foamed material layer.

* * * * *